United States Patent [19]
Bauer

[11] 3,927,364
[45] Dec. 16, 1975

[54] VOLTAGE MULTIPLIER ARRANGEMENT WITH CAPACITOR ROLLS SURROUNDED BY DIODES

[75] Inventor: Werner Bauer, Nurnberg, Germany

[73] Assignee: International Standard Electric Corporation, New York, N.Y.

[22] Filed: May 17, 1974

[21] Appl. No.: 470,881

[30] Foreign Application Priority Data
June 4, 1973 Germany............................ 2328290

[52] U.S. Cl. ..................... 321/15; 317/256; 323/79
[51] Int. Cl.² ...................... H02M 3/06; H01G 4/38
[58] Field of Search ...... 321/15; 317/258, 260, 256; 323/74, 79

[56] References Cited
UNITED STATES PATENTS

| | | | |
|---|---|---|---|
| 1,658,501 | 2/1928 | Valle................................... | 317/260 |
| 1,873,293 | 8/1932 | Davis, Jr. ............................ | 317/260 |
| 3,049,651 | 8/1962 | Adelson et al.................. | 317/260 X |
| 3,589,003 | 6/1971 | Kastner................................. | 321/15 |
| 3,818,305 | 6/1974 | Dumas.............................. | 321/15 X |
| R27,823 | 11/1973 | Cox.................................. | 317/258 X |

*Primary Examiner*—Gerald Goldberg
*Attorney, Agent, or Firm*—John T. O'Halloran; Menotti J. Lombardi, Jr.

[57] ABSTRACT

A voltage multiplier includes a plurality of capacitors and diodes in an integral unit. The capacitors are combined in capacitor rolls surrounded by diodes on the outside of the diodes can be positioned between two capacitor rolls. AC and dc-voltage-operated capacitors can be combined in separate or the same rolls. The ac capacitors may be located inside within the roll and the dc capacitors on the outside of the same roll. The capacitor plates are made of aluminum foil with intermediate polystyrene and polyester layers. A common capacitor electrode plate may be used for adjacent capacitors.

8 Claims, 7 Drawing Figures

VOLTAGE MULTIPLIER ARRANGEMENT WITH CAPACITOR ROLLS SURROUNDED BY DIODES

BACKGROUND OF THE INVENTION

1. Field of the Invention

The present invention relates to a voltage multiplier arrangement with diodes and capacitors wherein at least two capacitors are combined into a unit.

2. Description of the Prior Art

Voltage multiplier arrangements serve to produce high voltages and are particularly useful for the operation of television picture tubes. The diodes and capacitors are connected in separate series paths with a capacitor in parallel with two series diodes and are generally embedded in plastic for voltage protection.

In one known arrangement, the diodes and capacitors are disposed in a lattice configuration to keep the volume to a minimum. At each long side, two capacitors are arranged one behind another in the longitudinal direction; a diode is located at each short side and in the middle therebetween, and an additional diode is disposed in each diagonal direction. Thus, the length of this arrangement is essentially determined by the length of the capacitors, while the width is determined by the length of the diodes.

In another known arrangement, in order to meet the requirement for optimum utilization of the space available and for technical simplification, the ac-voltage-operated capacitors are connected in series and potted to form a unit, and the same is done with the dc-voltage-operated capacitors.

SUMMARY OF THE INVENTION

The primary object of the present invention is to provide a simplified voltage multiplier that occupies less space and insures the necessary voltage protection.

According to the invention a plurality of capacitors are combined in a unit which forms a capacitor roll. The space occupied by the potted elements is reduced by at least one-half that of known arrangements.

According to one feature of the invention, the capacitors are combined into two separate capacitor rolls and the diodes are disposed between said rolls.

In a variation of the invention, all capacitors are combined into one capacitor roll and surrounded by diodes on three sides.

The invention will now be explained in further detail with reference to the accompanying drawings.

DESCRIPTION OF THE PREFERRED EMBODIMENT

Figure 1:
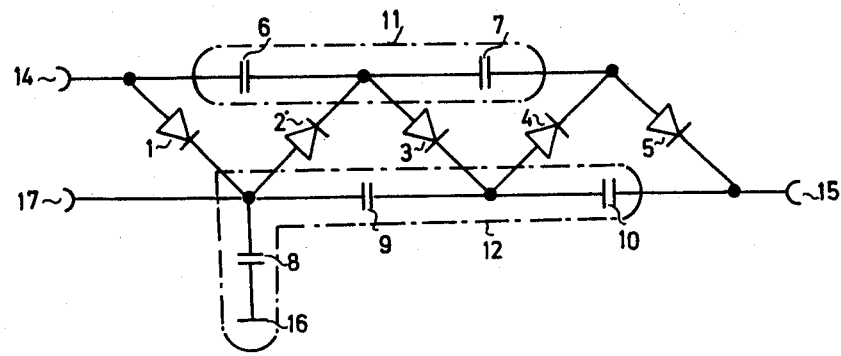
FIG. 1 is a circuit diagram of a voltage tripler using the present novel arrangement.
Figure 2:
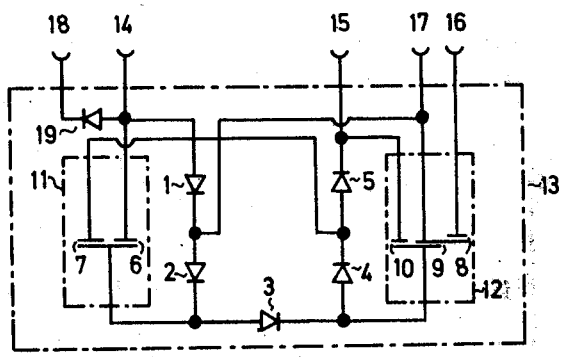
FIG. 2 schematically shows the structure of the arrangement of FIG. 1.
Figure 2A:
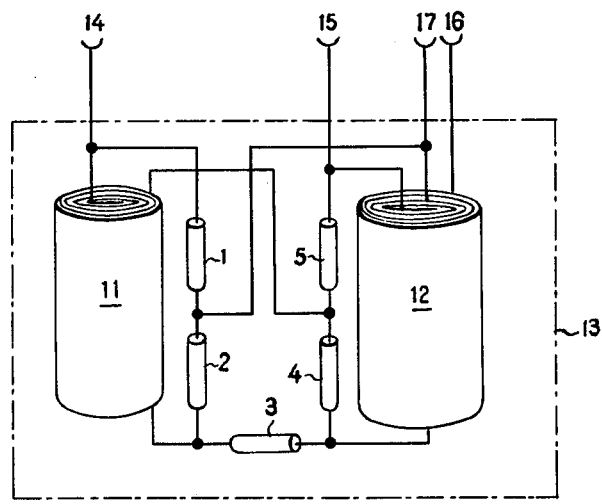
FIG. 2a shows the actual physical arrangement of the elements of FIG. 2.

In FIGS. 1 and 2, the diodes of the voltage tripler are designated by the reference numerals 1, 2, 3, 4, and 5, and the reference numerals 6 and 7 denote ac-voltage-operated capacitors which come into operation only during charging, while 8, 9, and 10 are dc-voltage-operated capacitors. The tripler is constructed in the form of a five-stage cascade circuit, the capacitor of the first stage, formed by the diode 1 and the capacitor 8, being grounded, and is used, for example, to generate the high voltage for operating color picture tubes. The capacitors 6 and 7 of the ac-voltage portion of the circuit are combined into a single capacitor roll 11, and the capacitors 8, 9, and 10 of the dc-voltage portion are combined in another capacitor roll 12. As shown in FIGS. 2 and 2a, the diodes 1, 2, 3, 4, and 5 are disposed centrally between capacitor rolls 11 and 12. The arrangement is potted in a case 13 filled with plastic. The ac-voltage input terminal 14, the dc-voltage output terminal 15, the ground terminal 16, and an additional terminal 17 are brought out on one side of the case 13. In addition, a terminal 18 is provided at a diode 19 connected to the ac-voltage input terminal 14.

Figure 3:
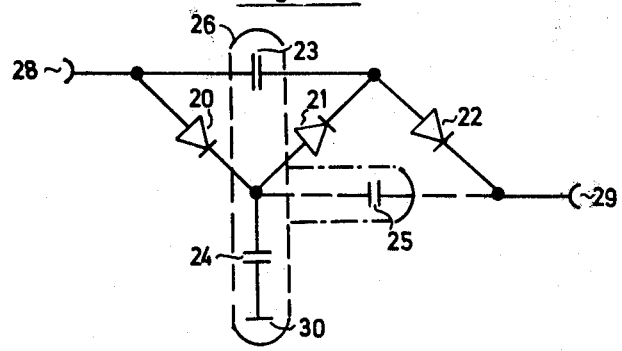
FIG. 3 is a circuit diagram of a voltage doubler as in the present invention.
Figure 4A:
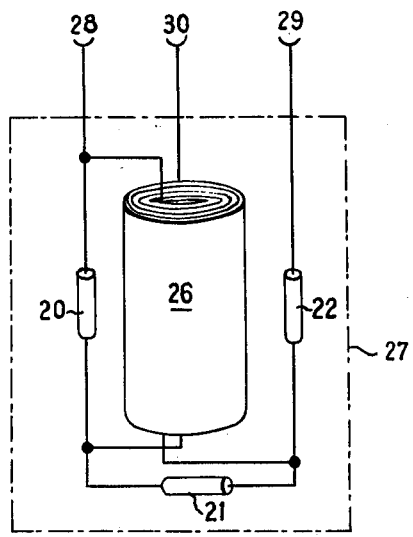
FIG. 4a shows the physical arrangement of the elements of FIG. 4.
Figure 4:
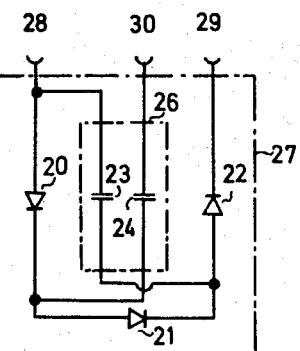
FIG. 4 schematically shows the structure of the arrangement of FIG. 3.

The high voltages necessary for operating the black-and-white picture tube in a television receiver are generated with a voltage doubler. In FIGS. 3, 4, and 4a, the diodes are designated by the reference numerals 20, 21, and 22, while 23 denotes an ac-voltage-operated capacitor, and 24 and 25 the dc-voltage-operated capacitors of a three-stage cascade circuit. The alternating voltage to be doubled is applied to the terminal 28, and the dc voltage to be doubled appears at the terminal 29. The terminal 30 represents the ground terminal, to which is connected the capacitor of the first stage of the cascade, formed by the diode 20 and the capacitor 24. Both the ac-voltage-operated capacitor 23 and the dc-voltage-operated capacitors 24 and 25, are all combined into one capacitor roll 26. As shown in FIGS. 4 and 4a, the capacitor roll 26 is disposed centrally and surrounded by diodes 20, 21, and 22 on three sides. The arrangement is potted in a case 27 filled with plastic. The terminals 28, 29, 30 are brought out on the fourth, free side. The capacitor 25, shown with a broken line in FIG. 3, is dispensed with in the arrangement of FIG. 4. This is primarily replaced by the self-capacitance of the picture tube when the multiplier arrangement is connected into the television receiver.

Figure 5:
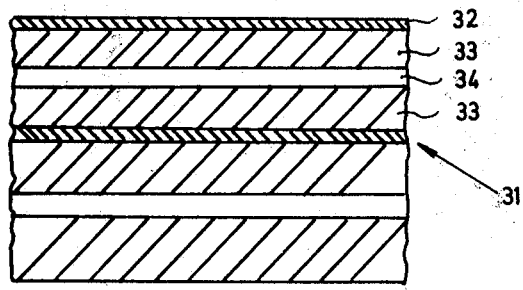
FIG. 5 is a section through a portion of a laminated structure of a capacitor roll.

The individual capacitors used in the present multiplier arrangements are designed as high-voltage capacitors having a laminated dielectric of polystyrene and polyester, and metal foil electrode plates. As shown in FIG. 5, the plates of a capacitor roll of this type are preferably aluminum foils 31, 32. Disposed between these foils are two polystyrene foils 33 with an intermediate polyester foil 34. The various terminals may be brought out at one or the other end of the roll or at both ends. At least two capacitor rolls of this laminated structure are wound over one another so that at least one multiple capacitor roll is obtained.

Since ac-voltage- and dc-voltage-operated capacitors may be combined into one capacitor roll, as shown in the embodiments of FIGS. 3 and 4, and as can also be done in the embodiments of FIGS. 1 and 2, the ac-voltage-operated capacitors are advantageously located inside within the roll. With such an arrangement, the corona discharge at the surface of the plastic-filled case 13 or 27 is greatly reduced.

In addition, the various possibilities of combining the capacitors, in conjunction with the diodes, make it possible to achieve particular input capacitances for voltage multipliers. For example, the input capacitance of the voltage multiplier arrangement is increased if at least one dc-voltage-operated and at least one ac-voltage-operated capacitor are combined into one roll.

What is claimed is:

1. A voltage multiplier comprising a plurality of series connected diodes and a plurality of capacitors, each capacitor being connected between opposite ends of a pair of said diodes and including an intermediate thermoplastic dielectric layer and a pair of metal foil electrode layers on opposite sides of said dielectric layer, said electrode and dielectric layers being rolled into a plurality of overlapping layers including said plurality of capacitors within a common roll, said diodes being connected to said electrode layers and being disposed about opposite outer sides of said roll.

2. The device of claim 1 including means applying a.c. and d.c. voltages to different respective groups of said capacitors.

3. The device of claim 1 wherein said plurality of diodes surround the sides and one end of said roll, the other end of said roll having external connections thereto, and a common thermoplastic cover encapsulating said diodes and capacitors, said external connections extending from one end of said cover.

4. The device of claim 1 including means applying a.c. and d.c. voltages to different respective groups of said capacitors within said common roll, said a.c. voltage capacitors being within the inner layers and said d.c. voltage capacitors being within the outer layers.

5. The device of claim 1 wherein said roll has external connections to the two ends thereof.

6. The device of claim 1 wherein said thermoplastic dielectric layer includes two outer layers of polystyrene and a layer of polyester therebetween.

7. The device of claim 1 wherein one electrode layer is common to two capacitors within said roll.

8. The device of claim 6 wherein said electrode layers are of aluminum.

* * * * *